Patented July 6, 1926.

1,591,151

UNITED STATES PATENT OFFICE.

JOHAN PIETER WIBAUT, OF AMSTERDAM, NETHERLANDS.

MANUFACTURE OF ALKYL HALIDES.

No Drawing. Application filed January 2, 1924, Serial No. 684,065, and in Netherlands January 12, 1923.

This invention relates to the manufacture of alkyl halides from gaseous hydrogen halide and olefines in gaseous condition.

It is known that olefines such as ethylene, propylene and their homologues can combine with hydrogen halide to form the corresponding alkyl halides, when an aqueous solution of hydrogen halide is heated with an olefine for about 70–100 hours at 100° C. under pressure. (Berthelot Compt. Rend de l'Acad. des Sciences, Paris T. XLIV, 1350; T. 50, 612). The addition of hydrogen chloride to ethylene does not occur under these conditions, nor does the addition of hydrogen bromide to ethylene or at least with great difficulty (Berthelot l. c. see also Liebigs Annalen 104, 184 (1857) and 115, 114 (1860)).

According to Sabatier and Mailhe (Compt. Rend. de l'Acad. des Sciences T. 141, 238 (1905)) the addition of gaseous hydrogen chloride and hydrogen bromide to olefines at a temperature below 300° C. occurs to a certain extent. This statement of the last named authors seems to relate to the higher olefines only, because they mention the formation of secondary and tertiary alkyl chlorides.

Experiments of the present inventor have shown that the addition of hydrogen bromide gas to propylene occurs to a certain extent at about 100–150° C., but the addition of hydrogen bromide to ethylene does not occur under these conditions. The addition of hydrogen chloride to the said olefines is still more difficult. Hydrogen chloride gas and propylene unite at temperatures below 150° C. only extremely slowly and to a small extent, and hydrogen chloride and ethylene do not react at all below 250° C. under ordinary conditions.

It has now been found that the addition of gaseous hydrogen halides to olefines in gaseous condition can be accelerated considerably by the use of certain catalysts. A catalytic effect on these reactions has not been known hitherto.

Sabatier and Mailhe (Compt. Rend. de l'Acad. des Sciences, Paris T. 141, 238, (1905).) have found that the decomposition of alkyl halides into hydrogen halide and olefine is promoted by the catalytic action of chlorides of bivalent metals such as $BaCl_2$, $NiCl_2$, $CoCl_2$, $FeCl_2$, $PbCl_2$ and Senderens (Bull. de la Soc. Chim. de France (4), 3, 827 (1908)) states that the decomposition of isobutylchloride and propylchloride into isobutylene and propylene respectively and hydrogen chloride is promoted by $Al_2O_3$, $SiO_2$, $Al_2(SO_4)_3$ and aluminium silicate. It does not follow, however, that the addition of hydrogen halide to olefines can also be influenced by catalysts, for instance at a much lower temperature. In an analogous reaction viz, the decomposition of $C_2H_5OH$ into $C_2H_4$ and $H_2O$ many catalysts are known, which promote the decomposition at about 350° C., but not one which accelerates the syntheses of $C_2H_5OH$ from $C_2H_4$ and $H_2O$ at lower temperatures.

The catalysts which promote considerably the addition of hydrogen chloride gas or hydrogen bromide gas to gaseous olefines, are in the first place the compounds of bismuth and related metals, such as antimony and other metals belonging to the fifth group of the periodic system. Particularly suitable catalysts are bismuth chloride and bismuth bromide.

When a mixture of propylene and hydrogen chloride gas is conducted over bismuth chloride a vigorous action occurs even at ordinary temperature. Propylene and hydrogen chloride combine to form isopropyl chloride with an almost quantitative yield, whilst only few by-products are formed.

When propylene and hydrogen bromide gas are conducted over bismuth bromide, isopropyl bromide is formed in the same way with excellent yield and very few by-products.

Ethylene and hydrogen chloride combine to form ethyl chloride with excellent yield when a mixture of these gases is conducted over bismuth chloride at an elevated temperature, preferably at a temperature between 100° and 200° C. In the same way ethylene and hydrogen bromide can be combined with aid of bismuth bromide as a catalyst. At ordinary temperature the action of hydrogen chloride on ethylene is slow but appreciable. Other suitable catalysts are the oxides and hydroxides of bismuth and antimony, bismuth nitrate, the halides of antimony, the oxyhalides of bismuth and antimony, the halides and oxyhalides of vanadium; also vanadyl chloride $VOCl_2$, vanadium trioxide, vanadium hydroxide, the chlorides of niobium and tantalum such as $NbCl_3$, $NbCl_5$, $TaCl_5$ and the like.

So for example a mixture of propylene and hydrogen chloride gas combines readily at ordinary temperature when conducted over $SbCl_3$ or $Sb_2O_3$, or $Sb(OH)_3$ or $SbOCl$. The same happens with the corresponding bromine compounds. When using a trihalide of bismuth or of antimony, it may be used in anhydrous condition, but a small amount of water vapour in the reacting gases does not interfere with the reaction.

The combination of ethylene with hydrogen chloride is also promoted considerably by antimony compounds, but in this case it is observed that bismuth compounds are superior catalysts, acting faster at lower temperatures.

The addition of hydrogen chloride to ethylene and propylene under the catalytic action of bismuth chloride occurs also when these gases are diluted with a large excess of other gases such as air. In this case it is advantageous to work at elevated temperature. The temperature, however, should not exceed 250° C. In this manner the process may be applied to gas mixtures such as town gas, coke-oven gas or other gases, proceeding from the distillation of coal. Also gas mixtures formed by destructive distillation of hydrocarbons such as oil gas or the gases obtained in the cracking process of petroleum products may be used. It is well known that the latter gases contain much ethylene and propylene.

When for example a mixture of town gas and hydrogen chloride gas is conducted at a temperature below 250° C. over bismuth chloride the ethylene is converted to ethyl chloride with an excellent yield.

It is advisable to apply the catalyst on an inert carrier, such as asbestos, kieselguhr, porous carbon, pumice stone or similar materials. For example, asbestos is impregnated with a concentrated solution of bismuth chloride and heated in a current of hydrogen chloride at about 200° C., thereby the water is removed and anhydrous bismuth chloride remains on the asbestos.

When the process is used with distillation-gases or other gases, in which the concentration of ethylene or propylene is less than 20%, the ethylchloride or isopropylchloride formed will be in the state of vapours at ordinary temperature in the products of the reaction. In order to separate these substances the excess of hydrogen chloride is removed by washing with water and then the alkyl chlorides are separated in any suitable way such as by cooling, by washing with a suitable solvent, by absorption in an activated charcoal or the like.

What I claim is:

1. Process for the manufacture of alkyl halides in which gaseous olefines mixed with hydrogen halide are conducted over a compound of a metal of the fifth group of the periodic system at a temperature below 250° C.

2. Process for the manufacture of alkyl halides in which gaseous olefines mixed with other gases and hydrogen halide are conducted over a compound of a metal of the fifth group of the periodic system, at a temperature below 250° C.

3. Process for the manufacture of alkyl halides in which gaseous olefines mixed with a hydrogen halide are conducted over a bismuth compound at a temperature below 250° C.

4. Process for the manufacture of alkyl halides in which gaseous olefines and a hydrogen halide are conducted over a trihalide of bismuth at a temperature below 200° C.

5. Process for the manufacture of alkyl halides in which the first members of the olefines series and a hydrogen halide are conducted over a compound of a metal of the fifth group of the periodic system at a temperature below 250° C.

6. Process for the manufacture of alkyl halides in which the first members of the olefine series and a hydrogen halide are conducted over a bismuth compound at a temperature below 200° C.

7. Process for the manufacture of ethyl chloride in which ethylene mixed with a hydrogen chloride is conducted over a tri-halide of bismuth at a temperature below 200° C. but at least as high as 100° C.

8. Process for the manufacture of ethyl chloride in which a gas mixture containing a comparatively small proportion of ethylene and a hydrogen chloride is conducted over a tri-halide of bismuth at a temperature below 250° C. but at least as high as 100° C.

9. Process for the manufacture of volatile alkyl halides which consists in conducting a gas containing a proportion of the first members of the olefine series and a hydrogen halide over a compound of a metal of the fifth group of the periodic system at a temperature below 250° C., washing the reaction product to remove acid vapours, conducting the washed gas over activated charcoal to absorb the formed alkyl halides, separating the absorbed alkyl halides from the charcoal by distillation and condensing the alkyl halides.

10. Process for the manufacture of volatile alkyl halides, which consists in conducting a gas containing a proportion of the first members of the olefines series and a halide of hydrogen over a tri-halide of bismuth at a temperature below 250° C., washing the reaction product to remove acid vapours, conducting the washed gas over activated charcoal to absorb the formed alkyl halides, separating the absorbed alkyl halides from the charcoal by distillation and condensing the alkyl halides.

In testimony whereof I affix my signature.

DR. JOHAN PIETER WIBAUT.